United States Patent
Andruet et al.

(10) Patent No.: US 7,051,970 B2
(45) Date of Patent: May 30, 2006

(54) PACK ARM ASSEMBLY FOR USE IN A TAPE DRIVE SYSTEM

(75) Inventors: Raul Andruet, Woodbury, MN (US); Albena V. Blagev, Woodbury, MN (US); Arne B. Boberg, Shoreview, MN (US); Jerome D. Brown, Wahpeton, ND (US); Fred W. Livermore, Stillwater, MN (US); Michael A. Mewes, Fargo, ND (US); Jason E. Moses, Breckenridge, MN (US); Christopher J. Zwettler, Lake Elmo, MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 10/879,601

(22) Filed: Jun. 29, 2004

(65) Prior Publication Data

US 2006/0006268 A1    Jan. 12, 2006

(51) Int. Cl.
*B65H 23/04* (2006.01)
(52) U.S. Cl. .................................. 242/548.3; 242/615.4
(58) Field of Classification Search ................ 242/332, 242/532, 539, 548.3, 547, 395, 346.2, 615.4, 242/615
See application file for complete search history.

(56) References Cited

U.S. PATENT DOCUMENTS

| | | | | |
|---|---|---|---|---|
| 1,807,274 | A | * | 5/1931 | Beidler |
| 1,942,869 | A | | 1/1934 | McMaster |
| 3,006,650 | A | * | 10/1961 | Austin ......................... 242/332 |
| 3,556,435 | A | * | 1/1971 | Wangerin ................... 242/332 |
| 3,627,230 | A | * | 12/1971 | Wangerin ................... 242/332 |
| 5,374,004 | A | | 12/1994 | von Behren |
| 5,533,690 | A | | 7/1996 | Kline et al. |
| 6,045,086 | A | | 4/2000 | Jeans |
| 6,450,438 | B1 | * | 9/2002 | McAllister et al. ...... 242/548.3 |
| 6,508,431 | B1 | | 1/2003 | Gavit |
| 6,719,238 | B1 | * | 4/2004 | Grant et al. |

* cited by examiner

*Primary Examiner*—William A. Rivera
(74) *Attorney, Agent, or Firm*—Eric D. Levinson

(57) ABSTRACT

A tape drive system is disclosed. The tape drive system includes at least one tape reel assembly, a storage tape, and at least one pack arm assembly. The tape reel assembly includes a hub defining a tape winding surface about which is wound the storage tape. The pack arm assembly is disposed adjacent the tape reel assembly and includes a pack arm and a pin. The pack arm defines a guide defining a pivot end and has at least one flexible flange cantilevered from a side of the guide. The pin is coupled to the tape drive system. In this regard, the pack arm is slidingly coupled to the pin and configured to follow the wound storage tape by moving axially relative to the hub and radially about the pivot end.

20 Claims, 5 Drawing Sheets

PACK ARM ASSEMBLY FOR USE IN A TAPE DRIVE SYSTEM

THE FIELD OF THE INVENTION

The present invention generally relates to a pack arm assembly for packing storage tape onto a hub in a tape drive system. More particularly, it relates to a pack arm assembly having a guide and at least one flexible flange.

BACKGROUND OF THE INVENTION

Data storage tape systems have been used for decades in the computer, audio, and video fields. The data storage tape system includes a tape drive and one or more data storage tape cartridges. During use, storage tape is transferred between a tape reel assembly within the cartridge and a separate tape reel assembly within the drive. In this regard, the storage tape is driven by a tape drive system defined by one or both of the cartridge and tape drive. Regardless of exact form, the data storage tape system continues to be a popular format for recording large volumes of information for subsequent retrieval and use.

With the above in mind, a data storage tape cartridge generally consists of an outer shell or housing maintaining at least one tape reel assembly and a length of magnetic storage tape. A storage tape is wrapped about a hub of the tape reel assembly and is driven through a defined path by a driving system. The housing normally includes a separate cover and a separate base. Together, the cover and the base form an opening (or window) at a forward portion of the housing permitting access to the storage tape by a read/write head upon insertion of the data storage tape cartridge into the tape drive. The interaction between the storage tape and the head can occur within the housing (i.e., a mid tape load design) or exterior to the housing (i.e., a helical drive design). Where the head/storage tape interaction is exterior to the housing, the data storage tape cartridge normally includes a single tape real assembly employing a leader block or similar device. Alternately, where the head/storage tape interaction is within the housing, a dual tape reel configuration is typically employed.

Regardless of the number of tape reel assemblies associated with a particular data storage tape cartridge, the tape reel assembly (also known as a spool) generally includes a hub and one or more reel flanges. In general, the hub includes a core that defines a tape winding surface. The reel flanges are optional, and, if employed, are disposed at opposite ends of the hub and spaced to accommodate a width of the storage tape.

The spool is a repository for the storage tape. In particular, the storage tape is wrapped onto the tape winding surface. In this regard, it is desired that the storage tape be packed onto the hub in a uniform manner. Specifically, edges of the storage tape should be uniformly packed such that the edges are evenly aligned. Significantly, storage tape that is not uniformly packed can be damaged as it traverses the tape drive system. Storage tape that is not uniformly packed is said to have staggered strands. Sources of staggered strands can include non-uniform guiding of the storage tape onto the hub, poor storage tape quality, and aerodynamic forces generated during the winding process. The staggered strands can take several forms, including isolated strands of storage tape that are staggered, popped storage tape strands, and a bulk storage tape stagger where individual popped strands cannot be identified.

Prior art tape winding systems have attempted to uniformly pack storage tape onto hubs. Unfortunately, these prior art tape winding systems do not account for storage tape wear. For example, one prior art tape winding system described in U.S. Pat. No. 6,508,431 employs a tape guide having rigid packing arms. The tape guide is rigidly mounted to a frame by a combination of rigid mounts and fasteners. The rigid packing arms include ceramic plates that contact the edges of the storage tape along an entire radius of the tape pack. In addition, a precisely formed spacer block is utilized to position the rigid packing arms relative to the storage tape, creating a rigid and inflexible tape-packing device. In this regard, the prior art tape guide potentially imparts continuous wear across the storage tape edges.

Another prior art tape winding system, utilizing a flexible packing guide, is described in U.S. Pat. No. 6,045,086. The packing guide is rigidly coupled to a support member. The packing guide employs pleats or corrugations in an attempt to increase the flexibility of the guide, and low friction coatings on a contact edge where the guide touches the film pack. However, the packing guide fails to account for wear imparted to the film that is already uniformly packed about the hub. That is to say, even in the case where the film pack is uniform, the packing guide still imparts a large axial force downward onto the film pack. Despite the presence of the pleats or corrugations, and despite the presence of the low friction coating, the support member splays the packing guide into wear-imparting contact with the film regardless of the uniformity of the film pack.

The winding and unwinding of storage tape from hubs will continue to be an integral step in storing and retrieving data in tape drive systems. With increasing speeds of reading/writing and advanced magnetic tape technology, accurate and consistent storage tape positioning is desirable. To this end, wear imparted to the storage tape as it is packed onto the hub will reduce the life cycle of the storage tape. Therefore, a need exists for a tape drive system capable of uniformly packing storage tape onto the spool with a minimum of storage tape wear.

SUMMARY OF THE INVENTION

One aspect of the present invention is related to a tape drive system. The tape drive system includes at least one tape reel assembly, a storage tape, and at least one pack arm assembly. The tape reel assembly includes a hub defining a tape winding surface about which is wound the storage tape. The pack arm assembly is disposed adjacent the tape reel assembly and includes a pack arm and a pin. The pack arm defines a guide having a pivot end and at least one flexible flange cantilevered from a side of the guide. The pin is coupled to the tape drive system. In this regard, the pack arm is slidingly coupled to the pin and configured to follow the wound storage tape by moving axially relative to the hub and radially about the pivot end.

Another aspect of the present invention relates to a method of winding a storage tape in a tape drive system. The method includes providing a rotatable tape reel assembly including a hub. The method additionally includes providing a pack arm assembly disposed adjacent to the tape reel assembly. In particular, the pack arm assembly includes a guide and a pin. The guide defines a pivot end and having at least one flexible flange cantilevered from the guide, and the pin is slidingly coupled to the pivot end. The method further includes rotating the tape reel assembly to affect a winding of storage tape about the hub. In this regard, upon winding of the storage tape, the guide moves relative to the wound storage tape such that the at least one flexible flange imparts a force of less than 100 grams to edges of the storage tape.

Yet another aspect of the present invention relates to a pack arm assembly for packing storage tape onto a hub in a tape drive system. The pack arm assembly includes a pack arm and a pin. The pack arm includes a guide and at least one flexible flange. The guide defines a tape surface, an exterior surface, opposing lateral sides, and a hub end opposing a pivot end, where the at least one flexible flange is attached to one of the opposing lateral sides. In this regard, the pin is slidingly coupled to a bore in the pivot end of the guide.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION OF THE PREFERRED EMBODIMENTS

Figure 1:
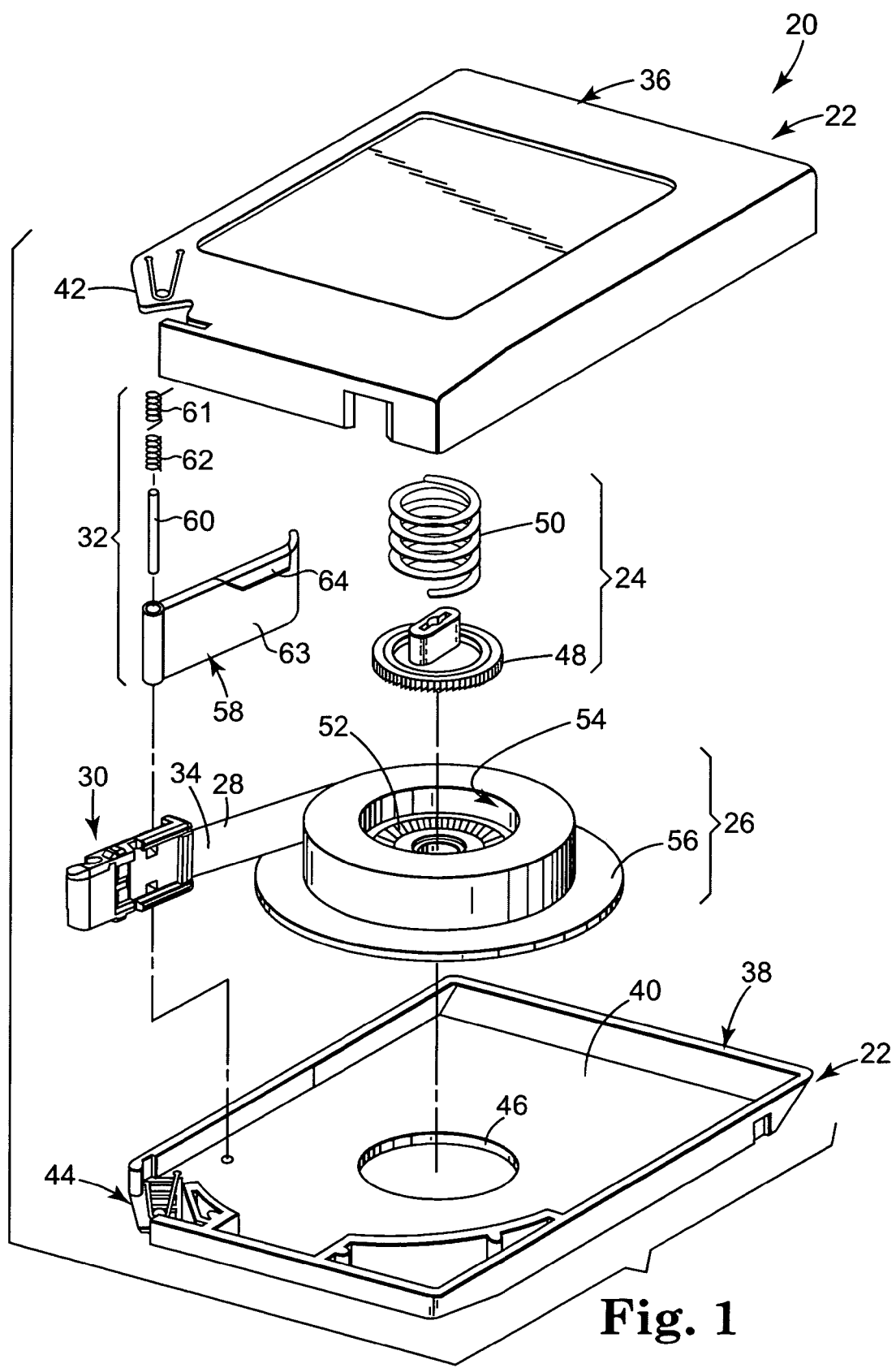
FIG. 1 is a perspective, exploded view of a data storage tape cartridge showing a pack arm assembly according to one embodiment of the present invention.

The present invention relates to a pack arm assembly useful as a tape drive system component, such as a component in a data storage tape cartridge or a tape drive. To this end, an exemplary data storage tape cartridge according to one embodiment of the present invention is illustrated at 20 in FIG. 1. Generally, the data storage tape cartridge 20 includes a housing 22, a brake assembly 24, a tape reel assembly 26, a storage tape 28 coupled to a leader block 30, and a pack arm assembly 32. The tape reel assembly 26 is disposed within the housing 22. The storage tape 28, in turn, is wound about the tape reel assembly 26 and includes a leading end 34 attached to the leader block 30. As a point of reference, while a single reel data storage tape cartridge 20 is shown, the present invention is equally applicable to other cartridge configurations, such as a dual reel cartridge.

The housing 22 is sized to be received by a typical tape drive (not shown). Thus, the housing 22 has a size of approximately 125 mm×110 mm×21 mm, although other dimensions are equally acceptable. With this in mind, the housing 22 is defined by a first housing section 36 and a second housing section 38. In one embodiment, the first housing section 36 forms a cover whereas the second housing section 38 forms a base. As used throughout the specification, directional terminology such as "cover," "base," "upper," "lower," "top," "bottom," etc., is employed for purposes of illustration only and is in no way limiting.

The first and second housing sections 36 and 38, respectively, are sized to be reciprocally mated to one another to form an enclosed region 40 and are generally rectangular, except for one corner 42 that is preferably angled and forms a tape access window 44. The tape access window 44 serves as an opening for the storage tape 28 to exit from the housing 22 such that the storage tape 28 can be threaded to a tape drive (not shown) when the leader block 30 is removed from the tape access window 44. Conversely, when the leader block 30 is stowed in the tape access window 44, the tape access window 44 is covered.

In addition to forming a portion of the tape access window 44, the second housing section 38 also forms a central opening 46. The central opening 46 facilitates access to the tape reel assembly 26 by a drive chuck portion of the tape drive (not shown). During use, the drive chuck portion disengages the brake assembly 24 prior to rotating the tape reel assembly 26 for access to the storage tape 28. The brake assembly 24 is of a type known in the art and generally includes a brake 48 and a spring 50 co-axially disposed within the tape reel assembly 26. When the data storage tape cartridge 20 is idle, the brake assembly 24 engages with a brake interface 52 to selectively "lock" the single tape reel assembly 26 to the housing 22.

The storage tape 28 is preferably a magnetic tape of a type commonly known in the art. For example, the storage tape 28 can be a balanced polyethylene naphthalate (PEN) based material coated on one side with a layer of magnetic material dispersed within a suitable binder system and coated on the other side with a conductive material dispersed within a suitable binder system. Acceptable magnetic tape is available, for example, from Imitation Corp. of Oakdale, Minn.

The leader block 30 covers the tape access window 44 and facilitates retrieval of the storage tape 28. In general terms, the leader block 30 is shaped to conform to the window 44 of the housing 22 and to cooperate with the tape drive (not shown) by providing a grasping surface for the tape drive to manipulate in delivering the storage tape 28 to the read/write head. In this regard, the leader block 30 can be replaced by other components, such as a dumb-bell shaped pin. Moreover, the leader block 30, or a similar component, can be eliminated entirely, such as with a dual reel cartridge design.

The tape reel assembly 26 comprises a hub 54 and a reel flange 56. The reel flange 56 is a lower flange and extends in a radial fashion from a lower side (not visible in FIG. 1) of the hub 54. Embodiments of the present invention are compatible with a hub 54 having both an upper reel flange (not shown) and a lower reel flange 56, and with a hub 54 having no reel flanges. In one embodiment, the hub 54 and the reel flange 56 cooperate to retain multiple wraps of the storage tape 28. Notably, where the cartridge 20 is a belt driven design, the reel flange 56 is not necessary in order to maintain the storage tape 28, and can, therefore, be eliminated. In the broadest sense then, the tape reel assembly 26 can comprise the hub 54 alone.

The present invention as more fully described below can be beneficially employed in data storage tape cartridges (having either single or multiple tape reel assemblies) and in tape drive systems having take-up reels. With this in mind, and with reference to FIG. 1, in one embodiment the pack arm assembly 32 includes a pack arm 58, a pin 60, a torsional spring 61, and an axial spring 62. The pack arm 58 includes a guide 63 and a flexible flange 64. The pin 60 couples the pack arm 58 to the housing 22. The springs 61, 62 combine to facilitate axial and radial movement of the pack arm 58 relative to the wound storage tape 28, as described below. The pack arm assembly 32 is disposed adjacent to the tape reel assembly 26 and is configured to uniformly pack the storage tape 28 onto the hub 54.

Figure 2:
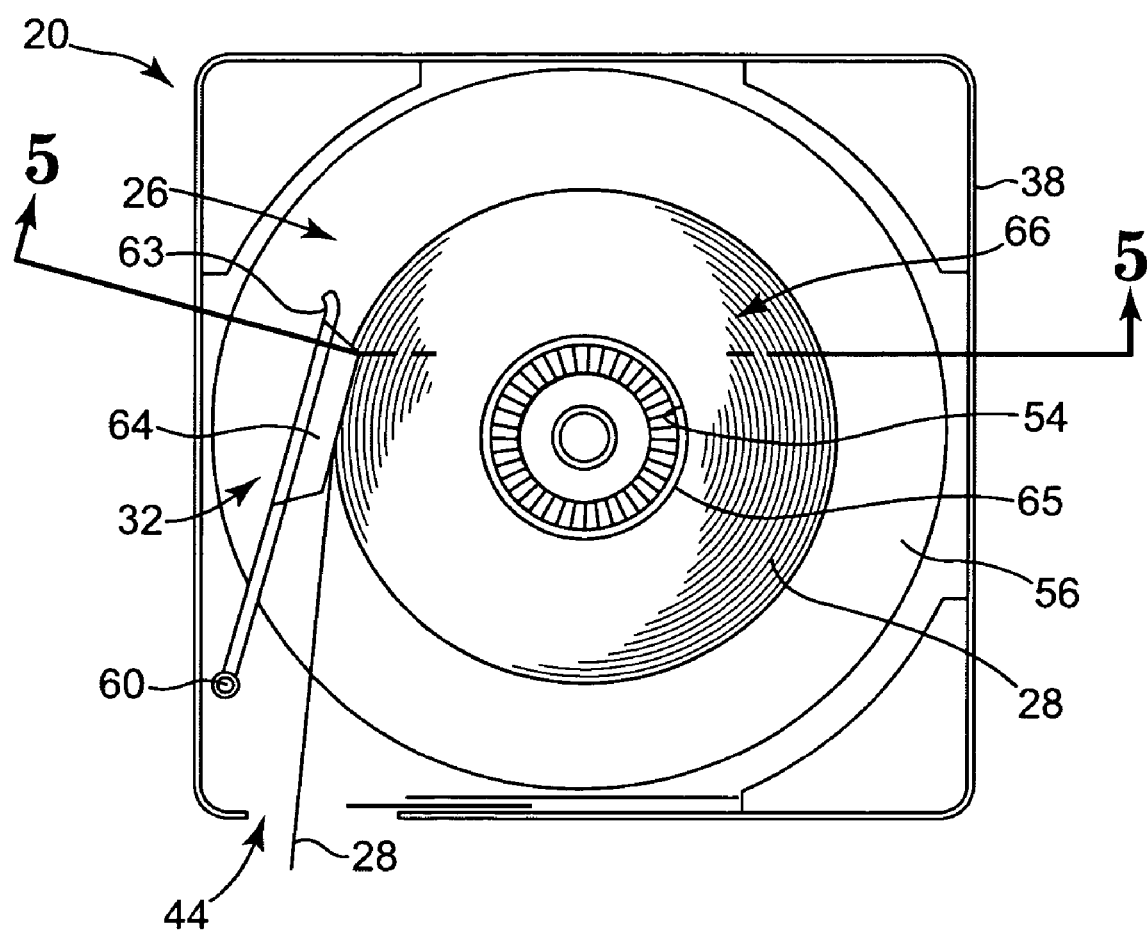
FIG. 2 is a top view of the pack arm assembly disposed into a base of the data storage tape cartridge of FIG. 1.

FIG. 2 illustrates the tape reel assembly 26 and the pack arm assembly 32 according to one embodiment of the present invention assembled in the base 38 of the data storage tape cartridge 20. Specifically, the first housing section 36 (FIG. 1) has been removed for improved viewing clarity. The tape reel assembly 26 is shown inserted into the base 38 and the storage tape 28 is wrapped about a tape winding surface 65 of the hub 54. In this regard, the storage tape 28 is packed about the hub 54 in the form of a pancake 66 (also called a tape pack 66 or a cookie 66). The pack arm assembly 32 is shown disposed adjacent the tape reel assembly 26. The guide 63 is slideably coupled to the pin 60 and to the springs 61, 62 (FIG. 1) and is adapted to move axially into and out of the paper and radially relative to the wound storage tape 28. That is to say, the guide 63 is a free-floating guide 63 and the pack arm assembly 32 is a following assembly that moves relative to the expansion and contraction of the tape pack 66. The flexible flange 64 is coupled to the guide 63 and exerts an axial force (downward into the paper as oriented in FIG. 2) onto edges of the storage tape 28 on the tape pack 66.

Figure 3:
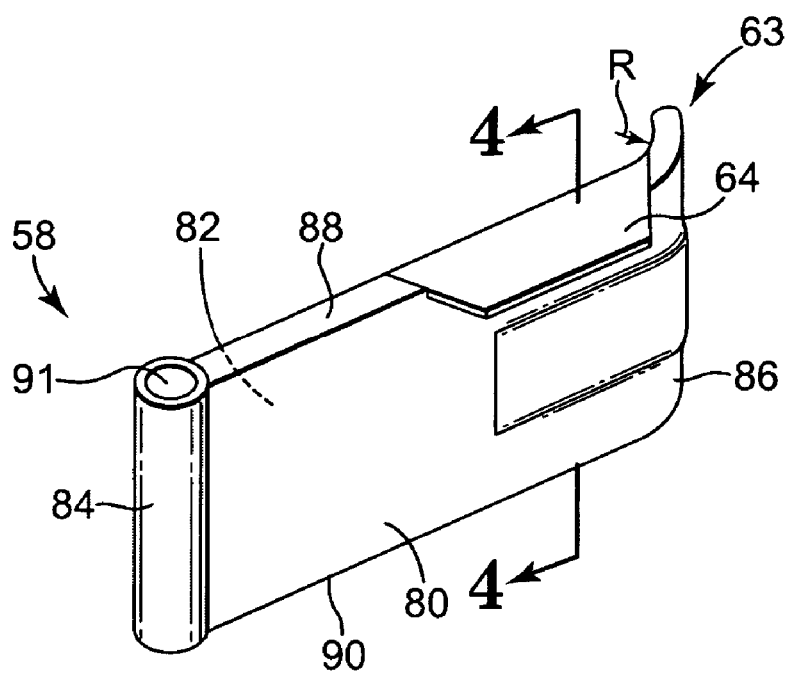
FIG. 3 is a perspective view of a pack arm according to one embodiment of the present invention.

A perspective view of the pack arm 58 according to one embodiment of the present invention is illustrated in FIG. 3. The pack arm 58 includes the guide 63 and the flexible flange 64. The guide 63 defines a tape surface 80 and an exterior surface 82. In one embodiment, the guide 63 is generally oblong and defines a pivot end 84 opposite a hub end 86, and opposing lateral sides 88 and 90. The pivot end 84 defines a bore 91 configured to slideably couple with the pin 60 (FIG. 1) in coupling the pack arm 58 to the base 38 (FIG. 2).

In addition, the hub end 86 defines a radius of curvature R such that the guide 63 is curved in lateral cross-section. In one embodiment, the guide 63 defines a curved surface in lateral cross-section. With this in mind, the radius of curvature R is selected such that the hub end 86 is displaced away from the tape pack 66 in response to air entrained in unwinding the storage tape 28 (FIG. 2) off of the tape pack 66 (FIG. 2). In a rewind process, where the storage tape 28 is wound onto the tape pack 66, the guide 63 is supported by the entrained air and maintains an offset position relative to the tape pack 66. To this end, the curved hub end 86 causes the air entrained between the guide 63 and the tape pack 66 to be smoothly transported along the tape surface 80 such that the guide 63 is not suctioned into contact with the tape pack 66.

Figure 4:
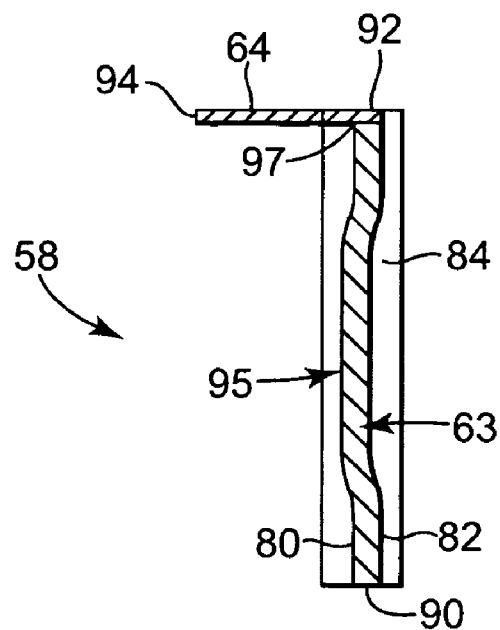
FIG. 4 is a cross-sectional view of the pack arm of FIG. 3.

A cross-sectional view of the pack arm 58 according to one embodiment of the present invention is illustrated in FIG. 4. In this regard, FIG. 4 depicts a transverse cross-section of the pack arm 58 taken adjacent the hub end 86. The flexible flange 64 defines a fixed end 92 attached to the guide 63 and a free end 94 cantilevered from the guide 63. An intersection of the fixed end 92 with the guide 63 defines a junction 97. In one embodiment, the fixed end 92 is welded to the guide 63, although other methods of attachment are acceptable. In addition, the tape surface 80 adjacent the hub end 86 is curved in transverse cross-section and forms a bulge 95. Specifically, a portion of the tape surface 80 extending from the hub end 86 lengthwise along the guide 63 is convex with respect to the exterior surface 82. The convex shape of the tape surface 80 shown in FIG. 4 (i.e., the bulge 95) corresponds to the raised area shown schematically in FIG. 3. In one embodiment, a portion of the tape surface 80 is non-linear in transverse cross-section, as shown in FIG. 3. In an alternate embodiment, an entirety of the tape surface 80 of the guide 63 is convex in transverse cross-section. In any regard, the bulge 95 is configured to impede the storage tape 28 (FIG. 1) from riding along the tape surface 80 of the guide 63 and contacting the junction 97. In this manner, the bulge 95 and the flexible flange 64 combine to align edges of the storage tape 28 with a minimum of wear imparted to the storage tape 28.

The pack arm 58 is a low inertia storage tape 28 packing device. Specifically, the pack arm 58 has a small mass and can move axially and radially relative to the tape pack 66 (FIG. 2) such that the pack arm 58 follows an outside region of the tape pack 66. In one embodiment, the pack arm 58 is aerodynamically supported by entrained air alongside the tape pack 66 and applies a low force to edges of the storage tape 28 such that wear imparted to the storage tape 28 is minimized. In one embodiment, the pack arm 58 is a low inertia pack arm having a mass of approximately 150 grams. When the pack arm 58 is disposed adjacent to the tape reel assembly 26, the pack arm 58 is aerodynamically supported by the aerodynamic forces created by air entrained from the winding and unwinding of the storage tape 28, as more fully described below.

It is desired that the flexible flange 64 have a stiffness that is adequate to align staggered edges of the storage tape 28 during a winding/unwinding process. In one embodiment, the flexible flange 64 is a polyester sheet having a thickness between 0.01 inch and 0.05 inch. In an alternate embodiment, the flexible flange 64 is stainless steel having a thickness of between 0.004 inch and 0.01 inch. In any regard, the flexible flange 64 is stiff enough to redirect a staggered strand of the storage tape 28 such that the tape pack 66 is uniformly packed and the staggered strands are substantially eliminated.

Referring to FIG. 1, the torsional spring 61 is coupled to pack arm 58 and affects a radial position of the pack arm 58 relative to the tape pack 66. The axial spring 62 can be any spring-like device suited to affect an axial position of the pack arm 58 relative to the tape pack 66. In one embodiment, the springs 61, 62 are steel springs. In an alternate embodiment, a single spring is provided that is both an axial spring and a torsional spring. In any regard, the pack arm 58 and the springs 61, 62 combine such that the pack arm 58 is configured to follow the tape pack 66 by moving axially relative to the hub 54 and radially about the pivot end 84 (FIG. 3) and is responsive to aerodynamic forces created between the moving storage tape 28 and the guide 63, as described below.

With additional reference to FIG. 1, the pin 60 can be any smooth pin selected to move freely within the bore 91 (FIG. 3). In one embodiment, the pin 60 is a stainless steel pin selected to have a diameter that is smaller than the bore 91. In another embodiment, the pin 60 is formed as a projection in the second housing section 38 such that the pack arm 58 (FIG. 3) slidingly couples with the pin 60.

Figure 5:
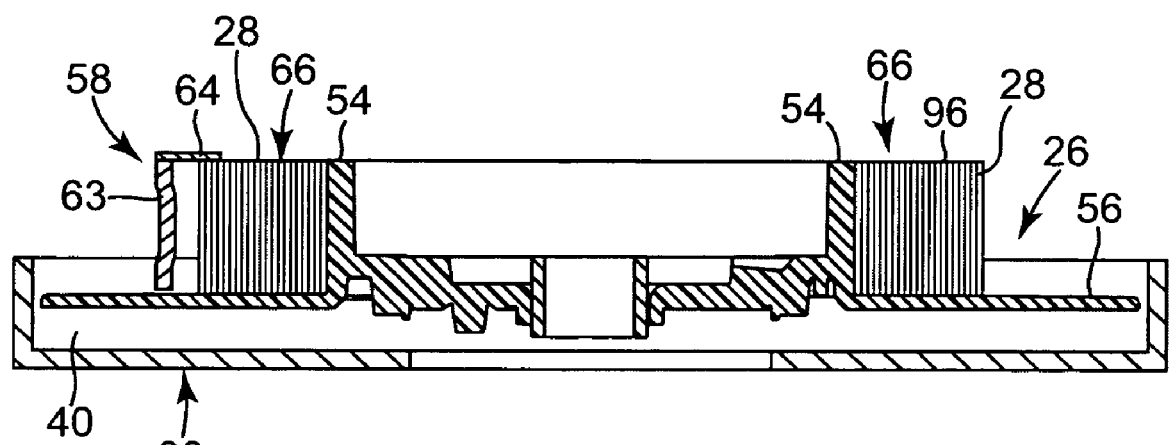
FIG. 5 is a cross-sectional view of the pack arm assembly as shown in FIG. 2.

A cross-sectional view of the tape reel assembly 26 and the pack arm 58 assembled in the base 38 is illustrated in FIG. 5. The tape reel assembly 26 is rotatably disposed within the enclosed region 40. The storage tape 28 is wound onto the hub 54 and forms the tape pack 66. The pack arm 58 is slidingly coupled with the pin 60 (FIG. 1) and the springs 61, 62 (FIG. 1) such that the guide 63 moves to follow the tape pack 66. To this end, the torsional spring 61 is adapted to move the guide 63 radially with respect to the tape pack 66 and the axial spring 62 is adapted to move the guide 63 axially (i.e., up and down) relative to the tape pack 66. In one embodiment, the torsional spring 61 is selected such that the guide 63 is aerodynamically supported alongside and does not contact the tape pack 66, as shown in FIG. 5. In an alternate embodiment, the torsional spring 61 is selected such that the guide 63 contacts and applies a radial force onto the tape pack 66 that is not overcome by the aerodynamic forces. Specifically, the radial pressure delivered to the tape pack 66 can be controlled (preferably minimized), such that wear imparted to the storage tape 28 is minimized. In a preferred embodiment, the guide 63 does not contact the storage tape 28 when the tape reel assembly 26 (FIG. 1) is in steady state rotation and the radial pressure of the guide 63 onto the hub 54 is zero. In any regard, the flexible flange 64 contacts tape edges 96 to align (i.e., index) the storage tape 28 with respect to the reel flange 56.

During a winding and unwinding operation, the storage tape 28 is wound about the hub 54 into the pancake 66. The pack arm 58 is selectively positioned to guide and situate the storage tape 28 onto the pancake 66. In particular, initial strands of the storage tape 28 that are packed onto the pancake 66 tend to agglomerate about the hub 54. Successive strands of the storage tape 28 exert a compressive force radially onto the hub 54, thus tightly packing the storage tape 28. In contrast, the final strands of the storage tape 28 entering onto the pancake 66 are loose and are affected by aerodynamic forces and low contact forces. Consequently, the final strands of the storage tape 28 oscillate vertically alongside the pancake 66, and can become staggered.

As best illustrated in FIG. 5, the flexible flange 64 contacts the tape edges 96 and indexes them relative to the reel flange 56. In this regard, the flexible flange 64 applies a selective downward (relative to the orientation in FIG. 5) force to the tape edges 96 such that staggered strands of the storage tape 28 relative to the pancake 66 are substantially eliminated (i.e., the storage tape 28 is uniformly packed). In another embodiment, the hub 54 includes an upper reel flange and the lower reel flange 56, and the pack arm 58 is disposed between the reel flanges to uniformly pack the storage tape 28. In this regard, the pack arm 58 can index the tape edges 96 against either one of an upper reel flange (not shown) or the lower reel flange 56.

It has been discovered, and described herein, that staggered strands of the storage tape 28 can be packed onto the pancake 66 with a slight downward (i.e., a slight axial) force, for example, an axial force of less than approximately 150 grams. In addition, in the case where the storage tape 28 is not staggered, the axial force onto the pancake can be minimized, for example, the force can be less than 50 grams, such that wear imparted to the storage tape 28 is minimized. To this end, and with additional reference to FIGS. 1 and 2, the pack arm assembly 32 is slideably coupled to the pin 60 such that the pack arm 58 moves axially and radially with the tape pack 66 in aligning the storage tape 28. When the pancake 66 is uniformly packed with the storage tape 28, the flexible flange 64 applies a force of less than 50 grams to aligned edges 96 of the storage tape 28, and preferably, the flexible flange 64 applies a force of less than 10 grams to aligned edges 96 of the storage tape 28 such that wear imparted to the storage tape 28 is minimized.

The flexible flange 64 contacts edges 96 of the storage tape 28 as the storage tape 28 is wound onto the pancake 66. In this regard, the reel flange 56 (FIG. 1) is a reference plane that collates and aligns the storage tape 28 as the flexible flange 64 exerts an axial force to edges of the storage tape 28. In particular, the flexible flange 64 has a stiffness sufficient to orient and direct potentially staggered storage tape 28 edges into alignment on the pancake 66. Specifically, the free end 94 of the flexible flange 64 can exert an axial force, preferably less than 150 grams, to the edges of the storage tape 28 at an outermost periphery of the pancake 66 in aligning the storage tape 28 about the hub 54.

In an alternate embodiment, the free-floating guide 63 is itself a leaf spring suitable for coupling directly to the housing 22 of the data storage tape cartridge 20 (FIG. 2). In this embodiment, the guide 63 is a leaf spring having a spring constant selected to minimize the radial force delivered into the pancake 66. In this regard, the flexible flange 64 is selected to apply an adequate axial force to the edges 96 of the storage tape 28 on the pancake 66, as described above.

With reference to FIG. 4, the tape surface 80 is convex in transverse cross-section and defines the bulge 95. In this regard, the bulge 95 offers a minimized surface area for potential contact with the storage tape 28. Specifically, only the bulge 95 is presented for contact with the storage tape 28 allowing the guide 63 to reach an equilibrium state at a larger distance from the tape pack 66. In this manner, friction generated due to the potential contact between the guide 63 and the storage tape 28 is likewise minimized.

Figure 6:
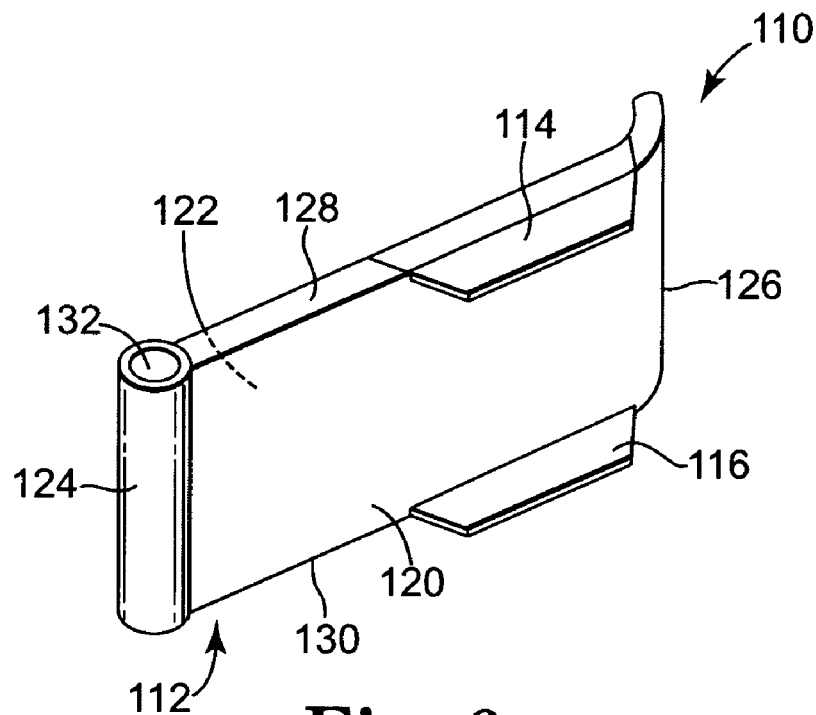
FIG. 6 is a perspective view of one embodiment of an alternate pack arm in accordance with the present invention.

An alternate embodiment of a pack arm 110 is illustrated in the perspective view of FIG. 6. The pack arm 110 includes a guide 112, a first flexible flange 114, and a second flexible flange 116. The guide 112 defines a tape surface 120 and an exterior surface 122. As shown in FIG. 6, the guide 112 is oblong and defines a pivot end 124 opposite a hub end 126, and opposing lateral sides 128 and 130. The hub end 126 is curved in lateral cross-section. In this regard, the guide 112 is configured to aerodynamically respond to air entrained during a winding/unwinding process, as described above. The pivot end 124 defines a bore 132 configured to slideably couple with a low friction pin (for example, the pin 60 of FIG. 1).

As noted above, and with additional reference to FIG. 1, the reel flange 56 is optional, such that the storage tape 28 can be wound exclusively about the hub 54. With this in mind, the pack arm 110 (FIG. 6) is configured to guide and situate the storage tape 28 about a hub without flanges. Specifically, the pack arm 110 has opposing flexible flanges 114, 116 positioned to guide edges of the storage tape 28 in a winding and unwinding process about a flangeless hub or a take-up spool (not shown). In this regard, the opposing flexible flanges 114, 116 extend radially from the opposing lateral sides 128, 130, respectively, of the guide 112 such that an overall lateral spacing between the opposing flexible flanges 114, 116 is slightly larger than a width of the storage tape 28. In one embodiment, the pack arm 110 is positioned adjacent a take-up spool in a tape drive system (neither shown) and the opposing flexible flanges 114, 116 have a lateral spacing of between approximately 0.001 inch to 0.01 inch larger than a width of the storage tape 28 to impart an axial force of less than 100 grams to edges of the storage tape 28. In an alternate embodiment, the opposing flexible flanges 114, 116 are compliant and permit an overall lateral spacing between the opposing flexible flanges 114, 116 to be slightly less than a width of the storage tape 28.

Figure 7:
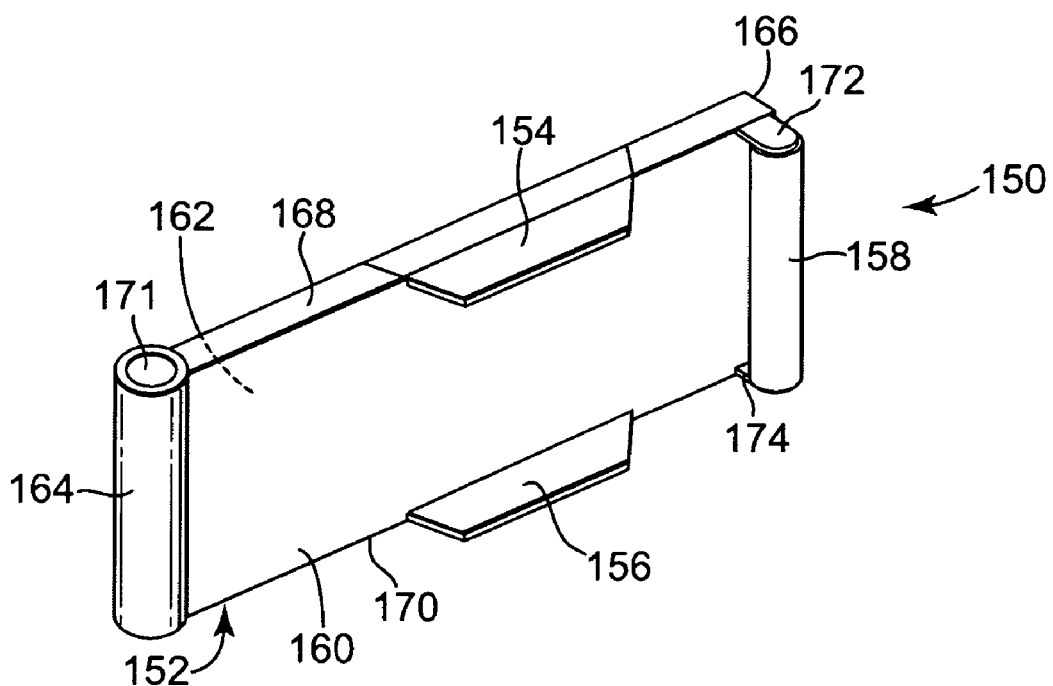
FIG. 7 is a perspective view of one embodiment of another alternate pack arm in accordance with the present invention.

Another alternate embodiment of a pack arm 150 is illustrated in the perspective view of FIG. 7. The pack arm 150 includes a guide 152, a first flexible flange 154, a second flexible flange 156, and a roller 158. The guide 152 defines a tape surface 160 and an exterior surface 162. The guide 152 has a generally rectangular planform defining a pivot end 164 opposite a hub end 166, and opposing lateral sides 168 and 170. The pivot end 164 defines a bore 171 configured to slideably couple with a low friction pin (for example, pin 60 of FIG. 1). A first fork 172 and an opposing second fork 174 couple the roller 158 to the hub end 166. In this regard, the roller 158 can rotate and contact the storage tape 28 (FIG. 2) to force entrapped air from between successive layers of the tape 28 as it is wound onto a hub or a take-up spool (not shown). In one embodiment, the roller 158 is a rubber roller. In an alternate embodiment, the roller 158 is a polymeric roller with a low friction coating on at least an exposed surface. For example, polytetrafluoroethylene (i.e., a Teflon® coating) can be coated onto the surface of the roller 158. Alternately, the roller 158 can be formed of polytetrafluoroethylene. In any regard, the roller contacts and is configured to impart minimal wear to the tape 28.

Each of the alternate pack arms 110 (FIG. 6) and 150 (FIG. 7) couple to a pin and are configured to follow the wound storage tape 28 by moving axially relative to the hub 54 and radially about a pivot end, as described above. In addition, each of the alternate pack arms 110 (FIG. 6) and 150 (FIG. 7) are compatible with a hub having no reel flanges, or a hub having one reel flange, or a hub having an upper and a lower reel flange.

Although specific embodiments have been illustrated and described for purposes of setting forth a preferred embodiment, it will be appreciated by those of ordinary skill in the art that a wide variety of alternate and/or equivalent implantations can be substituted for the specific embodiments shown and described without departing from the scope of the present invention. Those with skill in the chemical, mechanical, electromechanical, electrical, and computer arts will appreciate that the present invention can be implemented in a wide variety of embodiments. Specifically, a number of other pack arm assemblies other than those shown are within the scope of the invention. In particular, this application is intended to cover any adaptations or variations of low inertia pack arms having a free-floating guide and at least one flexible flange. In particular while the pack arm of the present invention has been described as being part of a data storage tape cartridge, or other tape drive system component, other applications of a low inertia pack arm are equally applicable. Therefore, it is manifestly intended that this invention be limited only by the claims and the equivalents thereof.

What is claimed is:

1. A tape drive system comprising:
   at least one tape reel assembly including:
      a hub defining a tape winding surface;
   a storage tape wound about the tape winding surface; and
   at least one pack arm assembly disposed adjacent the tape reel assembly, the pack arm assembly including:
      a pack arm defining:
         a guide defining a pivot end,
         at least one flexible flange cantilevered from a side of the guide, and
         a pin coupled to the tape drive system;
      wherein the pack arm is slidingly coupled to the pin and configured to follow the wound storage tape by moving axially relative to the hub and radially about the pivot end.

2. The tape drive system of claim 1, wherein the pack arm assembly is configured such that the at least one flexible flange contacts edges of the wound storage tape with a force of less than 150 grams.

3. The tape drive system of claim 1, wherein the pack arm assembly is configured such that the at least one flexible flange contacts edges of the wound storage tape with a force of less than 50 grams.

4. The tape drive system of claim 1, wherein the guide does not contact the wound storage tape when the at least one tape reel assembly is in steady state rotation.

5. The tape drive system of claim 1, further wherein the guide defines a hub end opposite the pivot end, the hub end curved in lateral cross-section.

6. The tape drive system of claim 1, wherein the guide is a leaf spring.

7. The tape drive system of claim 1, wherein the at least one pack arm assembly is disposed adjacent the tape reel assembly inside a data storage tape cartridge.

8. A method of winding a storage tape in a tape drive system comprising:
   providing a rotatable tape reel assembly including a hub;
   providing a pack arm assembly disposed adjacent to the tape reel assembly, the pack arm assembly including:
      a guide defining a pivot end and having at least one flexible flange cantilevered from the guide,
      a pin slidingly coupled to the pivot end;
   rotating the tape reel assembly to affect a winding of storage tape about the hub; and
   aerodynamically separating the guide from the storage tape during winding of the storage tape about the hub;
   wherein upon winding of the storage tape, the guide moves relative to the wound storage tape such that the at least one flexible flange imparts a force of less than 150 grams to edges of the wound storage tape.

9. The method of claim 8, wherein upon winding of the storage tape, the guide moves relative to the wound storage tape such that the at least one flexible flange imparts a force of less than 50 grams to edges of the wound storage tape.

10. The method of claim 8, wherein upon winding of the storage tape, the guide moves relative to the wound storage tape such that the at least one flexible flange imparts a force of less than 10 grams to edges of the wound storage tape.

11. The method of claim 8, wherein the method is characterized by the guide not contacting the wound storage tape on the rotating tape reel assembly.

12. The method of claim 8, wherein the guide defines a curved surface in lateral cross-section.

13. A pack arm assembly for packing storage tape onto a hub in a tape drive system, the pack arm assembly comprising:
   a pack arm including:
      a guide defining a tape surface, an exterior surface, opposing lateral sides, and a hub end opposing a pivot end,
      at least one flexible flange attached to one of the opposing lateral sides; and
      a pin slidingly coupled to a bore in the pivot end of the guide;
   wherein the tapa surface of the guide is non-linear in transverse cross-section.

14. The pack arm assembly of claim 13, further comprising a spring coupled to the pivot end.

15. The pack arm assembly of claim 13, further comprising a roller coupled to the huh end.

16. The pack arm assembly of claim 13, wherein the hub end is curved in lateral cross-section.

17. The pack arm assembly of claim 13, wherein the guide is a leaf spring.

18. The pack arm assembly of claim 13, wherein the at least one flexible flange is made of stainless steel having a thickness of between 0.004 and 0.01 inch.

19. The pack arm assembly of claim 13, wherein the tape surface extends continuously between the opposing lateral sides of the guide on the hub end.

20. A data storage tape cartridge comprising:
   a housing;
   at least one tape reel assembly disposed within the housing and including a hub defining a tape winding surface;
   a storage tape wound about the tape winding surface; and
   a pack arm assembly disposed adjacent the tape reel assembly and including:
      a pack arm defining:
         a guide defining a pivot end,
         at least one flexible flange cantilevered from a side of the guide, and
         a pin coupled to the housing;
   wherein the pack arm is slidingly coupled to the pin with the resulting assembly configured such that the pack arm follows the wound storage tape by moving axially relative to the hub and radially about the pivot end.

* * * * *